Figure 1:
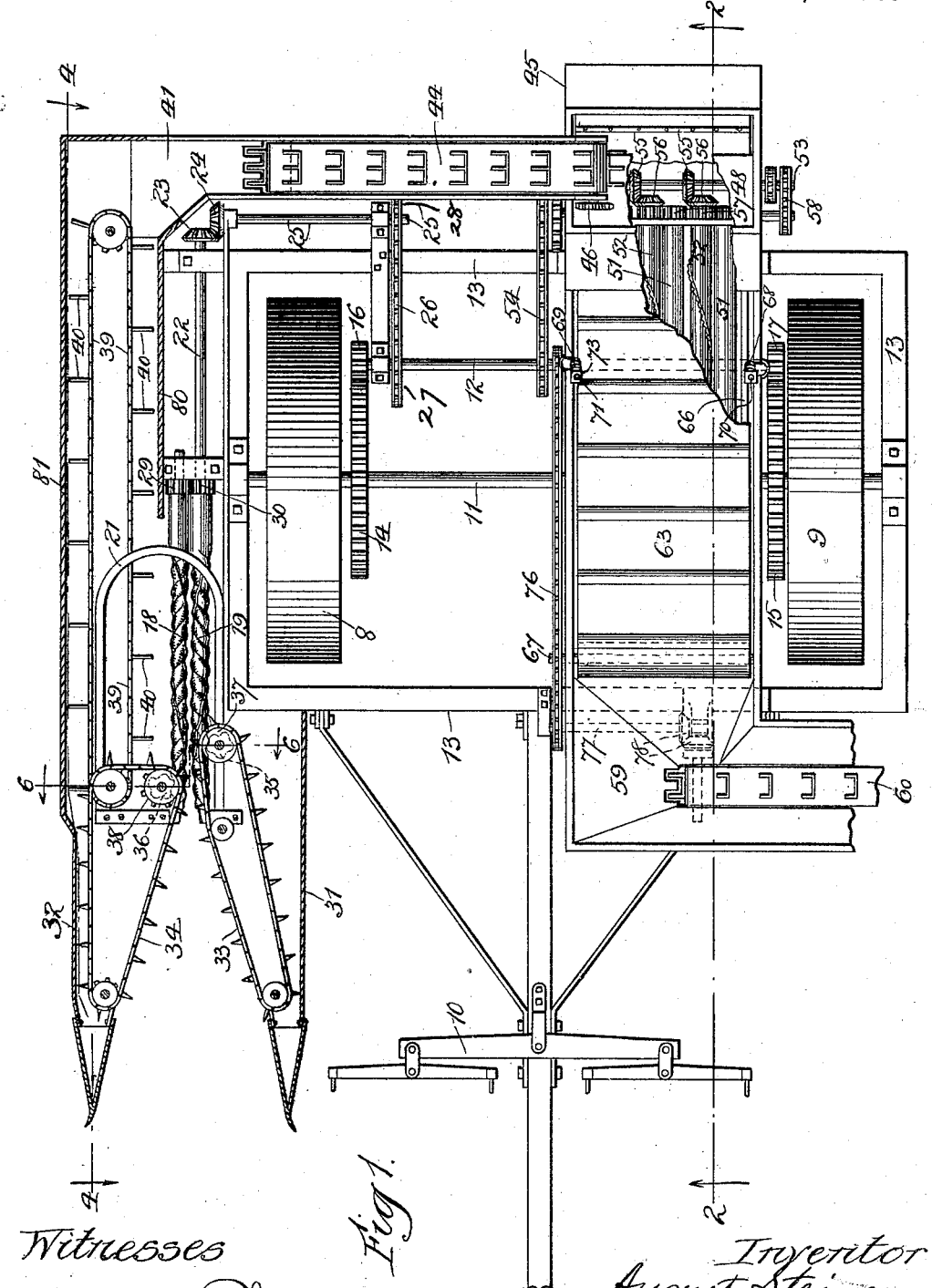

(No Model.) 4 Sheets—Sheet 1.
A. STEINER.
CORN HARVESTER AND HUSKER.

No. 535,228. Patented Mar. 5, 1895.

Witnesses
Wm. M. Rheem.
Wm. A. Henning

Inventor
August Steiner
by Brown and Darby
Attys

THE NORRIS PETERS CO., PHOTO-LITHO., WASHINGTON, D. C.

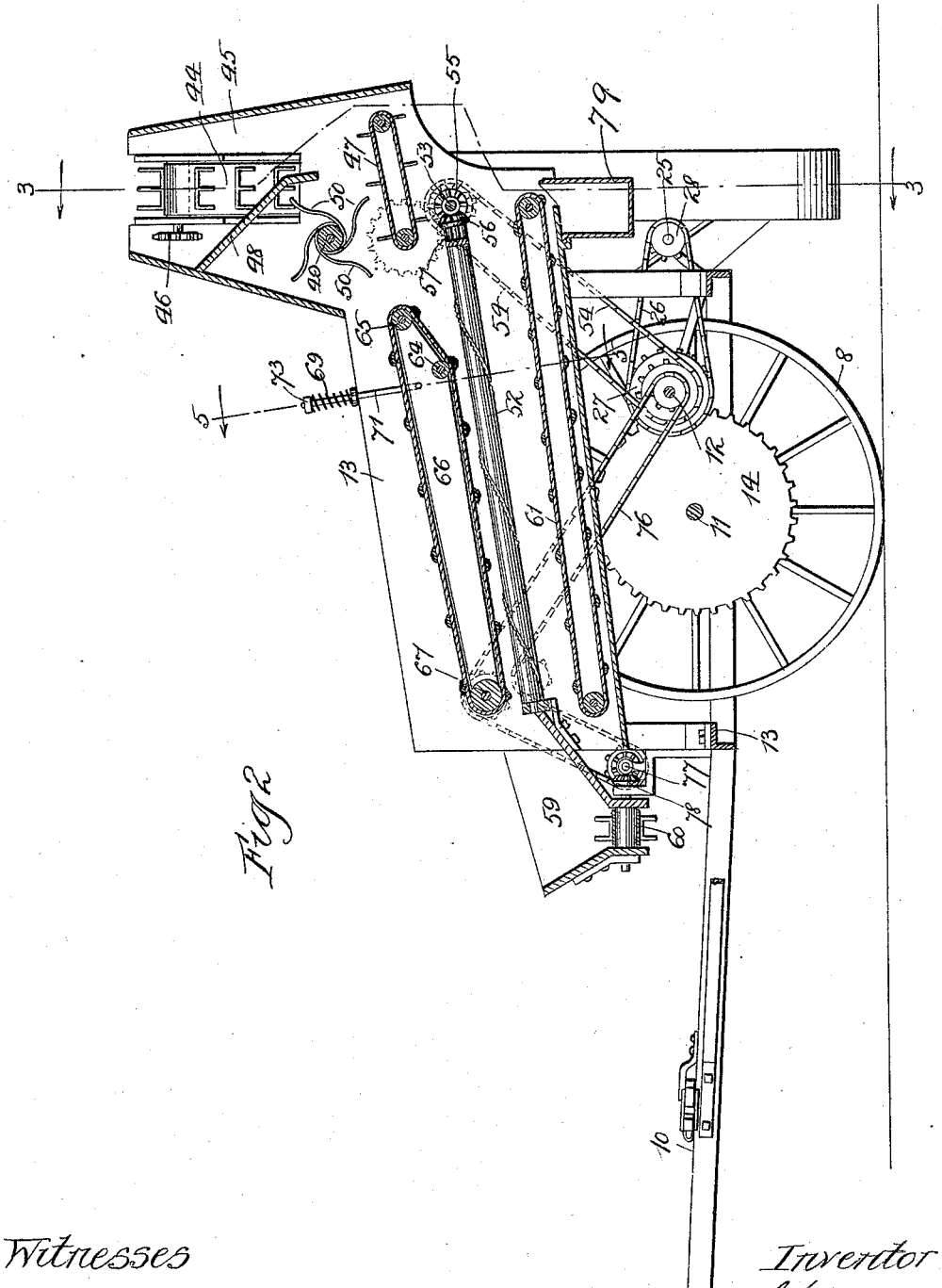

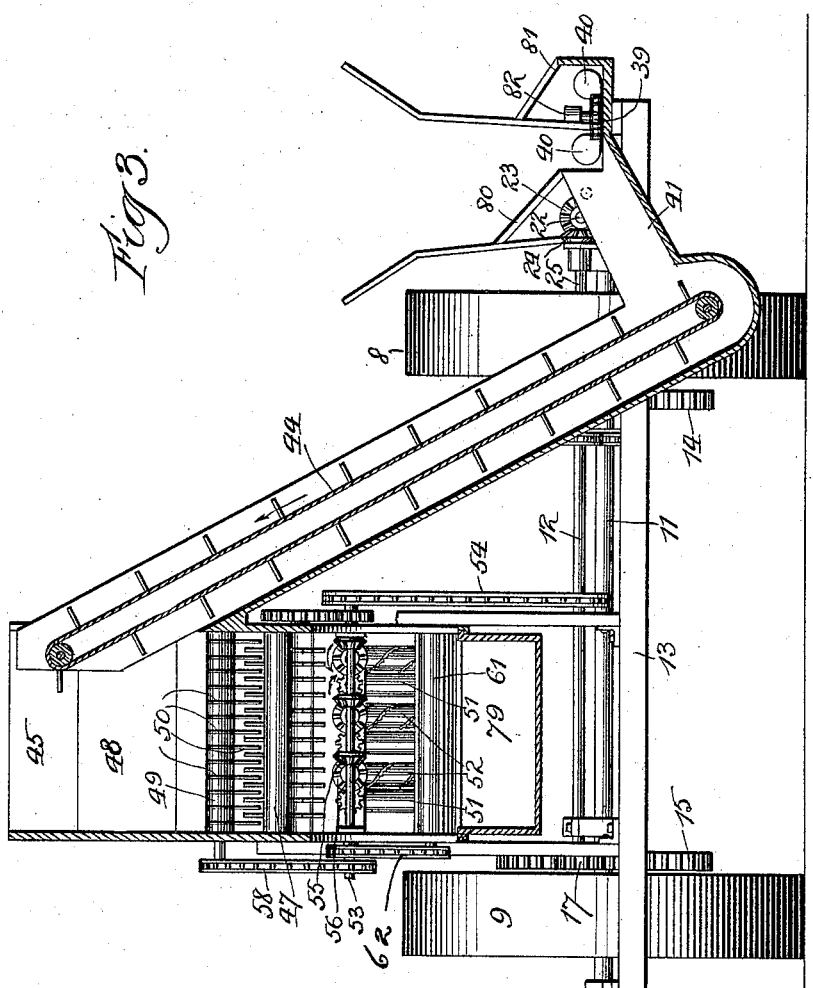

(No Model.) 4 Sheets—Sheet 4.
A. STEINER.
CORN HARVESTER AND HUSKER.
No. 535,228. Patented Mar. 5, 1895.
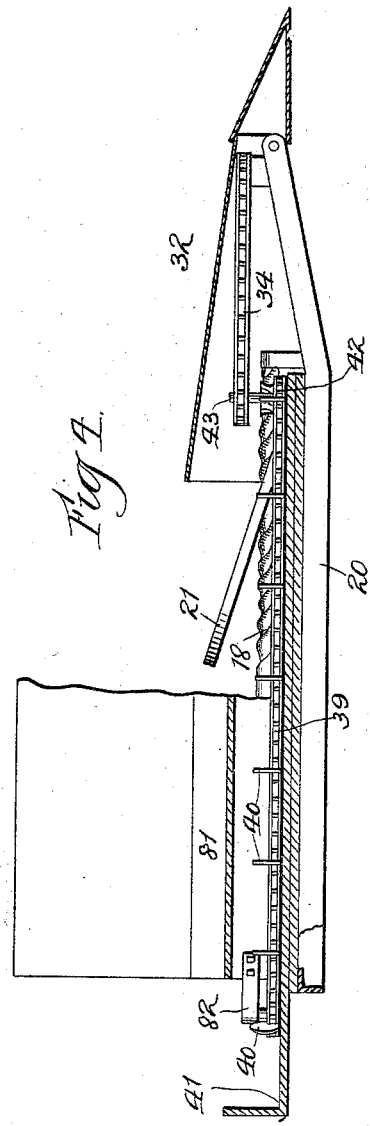
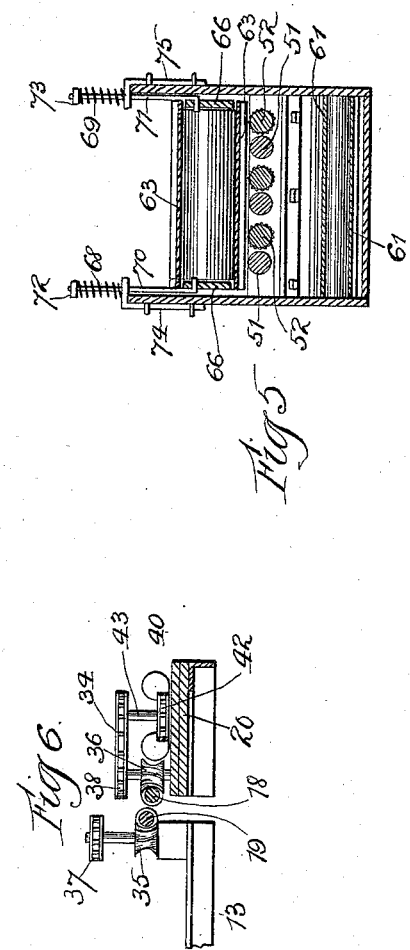

UNITED STATES PATENT OFFICE.

AUGUST STEINER, OF HOMEWOOD, ILLINOIS.

CORN HARVESTER AND HUSKER.

SPECIFICATION forming part of Letters Patent No. 535,228, dated March 5, 1895.

Application filed March 28, 1894. Serial No. 505,376. (No model.)

*To all whom it may concern:*

Be it known that I, AUGUST STEINER, a citizen of the United States, residing at Homewood, in the county of Cook and State of Illinois, have invented a new and useful Corn Harvester and Husker, of which the following is a specification.

This invention relates to corn stripping and husking mechanism, and it is designed as an improvement on Patent No. 436,386, granted to me September 16, 1890, for corn huskers.

It is the object of the present invention to provide a machine simple in construction, economical, and effective in operation for stripping ears of corn from the stalks, then husking or shucking the same in a thorough manner, and finally delivering the same to a suitable receptacle.

The invention consists in the construction, combination, arrangement and location of parts all as more fully hereinafter set forth, as shown in the accompanying drawings and finally more specifically pointed out in the appended claims.

Reference is now had to the accompanying drawings and to the various views thereof and to the reference signs appearing thereon, and wherein—

Figure 1 is a plan view of my entire machine, parts being in horizontal section and parts being broken away. Fig. 2 is a vertical longitudinal section taken on the line 2, 2, Fig. 1, looking in the direction of the arrows. Fig. 3 is a vertical transverse sectional view taken on the line 3, 3, Fig. 2, looking in the direction of the arrows. Fig. 4 is a vertical longitudinal sectional view taken on the line 4, 4, Fig. 1, looking in the direction of the arrows. Fig. 5 is a detail view in vertical cross section of the feeding apron and frame therefor of the husking rolls, taken on the line 5, 5, Fig. 2, looking in the direction of the arrows. Fig. 6 is a detail view in vertical transverse section, taken on the line 6, 6, Fig. 1, of the worm gearing for driving the conveyer belts, looking in the direction of the arrows.

The same reference signs are employed throughout the several views to designate the same parts, wherever they occur.

In the form illustrated in the drawings my improved husking machine is mounted on traction wheels, 8, 9, and is adapted to traverse the corn field, being propelled in any suitable way, as by means of horses, suitable draft means, 10, being shown for securing the horses thereto; but it is evident that my machine may be stationary and operated from any suitable source of power. This may be accomplished by raising the machine on blocks or any other suitable way, so that the traction wheels will be raised from the floor or ground and the main axle, 11, thereof operated by suitable belting; as will be readily understood.

The axle 11 of the traction wheels 8, 9, constitutes the main drive shaft for driving the several mechanisms hereinafter described.

Mounted on shaft or axle 11 are gear wheels, 14, 15, adapted to rotate through gears 16, 17, a countershaft, 12, arranged parallel with axle or shaft 11, and journaled in suitable bearings in the frame work, 13, of the machine. The main shaft or axle 11 is also journaled in suitable bearings in and serves to support the main frame 13, of the machine, as clearly shown.

One of the objects of the present invention is to detach the ears of corn from the stalk. In order to effect this result I mount and suitably journal the "snapping" rolls 18, 19, in suitable bearings in the framework, longitudinally with reference to the direction in which the machine moves, in case of a field traversing machine, and adjacent to one side of said machine. These "snapping" rolls are set a slight distance apart, and one of said rolls, preferably the inside roll, or the one nearest the machine is set in a plane slightly higher than the plane of the other or outer roll, as most clearly shown in Fig. 6, for a purpose presently to be described. The rear ends of rolls 18, 19, are journaled in a fixed part of the main frame, while the front ends are journaled, the inner and raised one, in the main frame, and the outer and lower one in a supplemental frame 20, supported from the main frame by means of a strong bow-shaped steel spring, 21, fastened at one end to the main frame and at the other end detachably secured to the supplemental frame as shown more fully in my Patent No. 436,386 above mentioned. By this construction a sufficient amount of elasticity or "give" is provided to accommodate variations in the size of the corn stalks which may be encountered, or to permit any rocks, or stones or sticks to pass readily between the "snapper" rolls 18, 19, without injury thereto, as will be readily understood.

"Snapping" rolls 18, 19, are formed with right and left spiral corrugations respectively, and also with long, intermeshing spirally arranged ribs or projections, as shown, in order to facilitate the detaching of the ears of corn from the stalk. The end, 22, of one of the snapping rolls is reduced in size and extends rearwardly of the machine and carries thereon a gear, 23, adapted to be engaged by a gear, 24, mounted on a short transverse shaft, 25, which is rotated from countershaft 12, by any suitable gearing, as by sprocket chain 26, mounted on gear 27, on shaft 12 and gear 28 on said shaft 25, as clearly shown. The two "snapping" rolls, 18, 19, are rotated in opposite directions by means of intermeshing gears, 29, 30. See Fig. 1.

By the construction above described I am enabled to make the "snapping" rolls much shorter in length without detracting from the efficiency of the machine, thus decreasing the cost and weight thereof as compared with the construction of my former patent. In advance of the snapping rolls are arranged suitable devices for feeding and guiding the stalks to the snapping rolls. These devices or "guiders" preferably comprise conical hollow pieces, 31, 32, such, for instance, as shown in my prior patent above referred to in which are mounted endless guide conveyer belts or chains, 33, 34, provided with spikes, as shown, see Fig. 1, adapted to grasp the cornstalk and feed the same to the snapping rolls. The spikes on conveyers 33, 34, extend through longitudinal slots cut in the inner or meeting sides of the "guiders." These conveyer guide chains constitute sprockets, and in my former construction were mounted on sprocket wheels driven by a system of counter shafts and sprocket gearing from the main shaft. In the present construction I provide worm wheels, 35, 36, adapted to mesh with and be rotated by the corrugated snapping rolls, as most clearly shown in Fig. 6, and on the shafts of worm wheels 35, 36, I mount sprocket wheels 37, 38, around which the sprocket guide conveyer chains pass and by which they are driven. See Fig. 1.

I have found in actual practice that sufficient power and speed is secured in this way to increase the efficiency of my machine and at the same time materially reduce the cost and complexity of the same, and I consider this an important feature of my present invention.

By the action of the mechanism above described the ears of corn are snapped or detached from the stalk and by reason of the elevation of the inside roll above the outer roll the ear, when detached falls or is forced over the lower roll into a channel along which it is fed by a conveyer chain 39, having pushers, 40, thereon, and delivered into a trough or raceway, 41, at the rear end of the machine. See Figs. 1 and 3. Conveyer 39 is in the form of a sprocket chain and is driven by a gear wheel 42, mounted on a short shaft 43, which is in turn driven by means of guide conveyer chain 34. See Figs. 1, 4 and 6.

I provide an elevator conveyer chain, 44, arranged at the rear of the machine in position to pass through the lower end of the hopper or raceway, 41, and is adapted to elevate the ears of corn and deliver the same into a hopper, 45. See Figs. 1, 2 and 3. Elevator conveyer 44 may be driven in any suitable manner, preferably from the upper shaft thereof through gear wheel 46 and any suitably arranged gearing therefor.

The ears of corn as they are delivered into hopper 45 fall upon an endless slowly traveling conveyer belt, 47, by which they are delivered to the husking rolls, presently to be described. A flange or apron 48, serves to guide the ear in its descent through the hopper to conveyer belt, 47, and to properly deliver the same thereto. See Fig. 2.

I have found in the operation of my former machine that frequently and especially in the case of fresh corn, that is, corn which may be husked before a frost has fallen thereon, the husks are not readily removed or shucked therefrom by the shucking or husking rolls by reason of the fact that the husks in fresh corn closely envelop and inclose the ear so as to make it difficult for the husking rolls to grasp the husk and to effectually remove the same without injury to the grains of corn. In order to obviate this difficulty in a most efficient manner I provide a cylinder 49 and suitably journal the same transversely in hopper 45 and mount thereon a series of spring fingers 50, the projecting ends of which are adapted to rotate in a path adjacent to the top of conveyer belt 47. Suitable gearing, presently to be described, is provided for rotating cylinder 49 at a higher peripheral speed than the speed at which conveyer belt 47 travels. The purpose of this construction and the result accomplished thereby is that as conveyer belt 47 slowly feeds the ears of corn to the husking rolls, they come in contact with the relatively rapidly rotating spring arms or fingers 50 which loosen the husks sufficiently to enable the husking rolls to grasp the same and effect a thorough husking or shucking of the ears.

From the conveyer belt 47 the ears, after being subjected to the action of the loosening spring arms 50, are delivered to the husking rolls 51, 52. These rolls are, in the form shown, arranged in pairs, and on an incline toward the front of the machine, as shown most clearly in Fig. 2. One roll of each pair may be provided with a smooth surface while the other roll of that pair may be provided with a projection or rib, which may be roughened or serrated, extending spirally therearound throughout the length thereof, as shown. Adjacent to the rear ends of the husking rolls and transversely thereof is arranged a shaft 53 adapted to be rotated from counter shaft 12 in any suitable manner as by sprocket chain 54. Gear wheels 55, 55, mounted on shaft 53 drive gear wheels 56, 56, carried in the ends of one husking roll of each pair. The other roll of each pair is rotated in the opposite direction by intermeshing gears 57 mounted on each roll of each pair of rolls, as shown.

Conveyer belt 47 is slowly driven by means of gearing intermediate its driving shaft and shaft 53. See Figs. 2 and 3. This gearing may comprise cog or spur wheels, as shown. When it is desired to change the relative speed of the parts operated by these gears, other gears of different relative sizes may be substituted, as will be obvious.

The drum carrying the spring arms may receive its rotation through gearing as 58 from shaft 53, as shown.

The action of the husking rolls is to grasp the husk or shuck and strip the same from the ear of corn as the ear is forced along said rolls, and the husked ear is delivered into hopper 59 where an elevator chain 60, removes the same and delivers it to any suitable receptacle prepared therefor, as a wagon adapted to move along beside the husking machine as it traverses a field, or, in case of a stationary machine, then to a barrel or other convenient receptacle. The husks or shucks, as they are stripped from the ear of corn are carried between the husking rolls, by reason of said rolls revolving toward each other, and are deposited on a conveyer belt 61, by which they are fed to the rear of the machine, and, if it is desired to preserve them for further use, they are delivered to any suitable receptacle provided therefor. Conveyer belt 61 may be caused to travel in any suitable way, as by means of gearing 62, driven from shaft 53. See Fig. 3.

In order to hold the ears of corn to the action of the husking rolls and at the same time assist in the feed of the ears along said rolls, I provide a power driven conveyer belt 63, and arrange the same over and in proximity to the upper surface of said rolls, and in order to permit an easy ingress of the ears of corn between said conveyer belt and the husking rolls I provide two rolls, 64, 65, at or near the rear extremity of the frame in which said conveyer belt is mounted, the extreme rear one, 65, of which is arranged in a higher plane than the other, and around these rolls the conveyer belt is adapted to pass, thus being deflected at its rear end or the ingress end so as to provide a mouth for the ears of corn, as will be clearly seen in Fig. 2.

In order that access may be readily had to the husking rolls and in order to make provision for varying sizes of ears of corn I mount conveyer belt 63 in a supplemental frame 66, and pivot the same at its front end around the shaft or roll 67 which drives said belt, and I yieldingly support the front end of said frame through springs 68, 69, mounted on angle rods, 70, 71, detachably secured to the sides of said frame, see Fig. 5, and which springs bear at one end against an adjustable nut, 72, 73, on said angle rods and at the other end against an angle rod 74, 75, through a perforation in which said rods 70, 71, are adapted to pass, the said rods, 74, 75, being attached to the main frame 13, of the machine. By this construction not only can frame 66 be readily detached and swung on its driving roll or shaft 67, but the conveyer belt is yieldingly supported to hold the ear upon and in contact with the husking rolls while they are stripping or husking the ears, and to afford sufficient yield to accommodate variations in the size of ears to be husked.

Drive roll or shaft 67 may be positively driven in any suitable way preferably from counter shaft 12 by means of a sprocket chain 76, which also drives a short shaft, 77, which through suitable gearing 78, drives the elevator chain 60. See Fig. 1.

In order to avoid waste in case grains of corn may become detached from the ear while being subjected to the action of the rotating spring arms 50, or of the husking rolls, I provide a removable box, 79, at the delivery end of the husk conveyer adapted to receive any grains that may become detached, as such grains would first fall between the rolls and would be caught by the husk conveyer, as will be apparent.

In order to avoid the possibility of husks or other parts of the stalk or any other substances catching in the gears 29, 30, in the "snapping" rolls, 18, 19, I may provide a covering therefor as indicated at 80, Figs. 1 and 3. In like manner and for a similar purpose I provide a cover for the return part of conveyer chain 39, as indicated at 81.

In order to avoid the possibility of the ears of corn being carried farther than the raceway or trough 41, by conveyer chain, I may, in some cases provide a spring, or other device as indicated at 82, Figs. 3 and 4, to insure a disengagement of the ear from the conveyer.

A suitable covering may be provided for the gearing 55, 56 and 57 in order to prevent them from becoming clogged by particles of husks or other substances falling therein.

While I have shown a specific form of mechanism for carrying out the principles of my invention, it is obvious that many changes and modifications would readily suggest themselves to persons skilled in the art and still fall within the spirit and scope of my invention. I therefore desire it to be understood that I do not limit myself to the exact details shown; but

Having now described my invention and illustrated a preferred form of mechanism for applying the same, what I claim as new, and desire to secure by Letters Patent of the United States, is—

1. In a corn husking machine, snapping rolls provided with spiral corrugations for detaching the ears of corn from the stalk, gathering devices for feeding the stalks to the snapping rolls, and a worm gear adapted to engage the corrugations in the snapping rolls for actuating said gathering devices; as and for the purpose set forth.

2. In a corn husking machine, a main shaft, a counter shaft driven thereby, a pair of snapping rolls, gearing intermediate said counter shaft and one of said rolls for driving the same, gearing intermediate said rolls for driving the one from the other in opposite directions, gathering devices for feeding the stalks to the snapping rolls and a conveyer arranged adjacent to said snapping rolls and adapted to receive therefrom an ear of corn, a shaft gearing thereon, adapted to operate both said gathering devices and said conveyer, and means operated by said rolls for driving said shaft; as and for the purpose set forth.

3. In a corn husking machine husking rolls, a conveyer device for conveying the ears of corn to said husking rolls, in combination with a rotating device for loosening the husks on said ears, said conveyer device adapted to convey the ears of corn past said rotating device; as and for the purpose set forth.

4. In a corn husking machine husking rolls adapted to husk ears of corn, a conveyer belt adapted to convey and deliver ears of corn to said husking rolls, in combination with a rotating drum carrying spring arms and arranged in the path of travel of the ears of corn; as and for the purpose set forth.

5. In a corn husking machine a device for loosening the husks on the ears of corn preparatory to removing said husks, comprising a rotating drum carrying spring arms and adapted to receive rapid rotary motion, in combination with a slowly moving conveyer said drum arranged in the line of feed of said conveyer; as and for the purpose set forth.

6. In a corn husking machine a conveyer belt, adapted to be moved slowly to feed the ears of corn, in combination with a drum having spring arms and adapted to be rotated rapidly and arranged adjacent to said conveyer belt, as and for the purpose set forth.

7. In a corn husking machine a conveyer belt, means for moving the same slowly to feed the ears of corn, a drum having spring arms and means for rotating said drum rapidly in the direction in which said belt is traveling, substantially as and for the purpose set forth.

8. In a corn husking machine, a main frame, a roller journaled therein, means for driving said roller, a supplemental frame pivoted at one end concentric with said roller, a feed and compressor belt supported by said supplemental frame and adapted to be driven by said roller, means for supporting the free end of said supplemental frame, comprising angle bolts, secured respectively to said main and supplemental frames, and springs interposed between said angle bolts; as and for the purpose set forth.

9. In a husking machine a main frame, a roller journaled therein, means for driving the same, a supplemental frame pivoted at one end upon said roller to rock therearound, angle bolts detachably secured to said main frame, other angle bolts secured to said supplemental frame at the free end thereof, springs mounted upon said first mentioned angle bolts and adapted to support said last mentioned angle bolts, a compressor and feed belt mounted upon said supplemental frame, and adapted to be actuated by said roller, and a deflecting roller arranged at the free end of said supplemental frame around which said belt is adapted to pass, in combination with conveying and husking devices; as and for the purpose set forth.

10. In a husking machine, ear detaching devices, means for conveying the detached ear, a rotary husk loosening device arranged in the path of the feed of the ear and means for rotating said loosening devices more rapidly than the ear is fed, husking devices, conveying devices for removing the husked ear, and means for operating these several devices as and for the purpose specified.

11. In a husking machine ear detaching devices, conveying devices for the detached ear, a husk loosening device comprising a rotary drum having spring arms arranged in the path of the feed of the ear means for rotating said drum more rapidly than the ear is fed, husking devices, means for holding and feeding the ears along the husking devices, a husk conveyer, and means for operating these several parts as and for the purpose specified.

12. A corn harvester and husking machine as an organized mechanism, comprising gathering devices, snapping rolls arranged to detach the ear of corn from the stalks, conveying mechanism for conveying the detached ear, said snapping rolls arranged to deliver said detached ear to said conveying devices said conveying devices comprising a slowly moving part, a husk loosening device arranged in the path of travel of said slowly moving part of the conveyer mechanism, means for rapidly rotating said husk loosening devices in the same direction as that in which said conveying device is moved, husking rolls adapted to receive the ear from said loosening device, a compressing and feed belt arranged adjacent to said husking rolls, a conveyer for the husks, and means for delivering from the machine the husked ear, all combined and arranged as and for the purpose set forth.

In testimony whereof I have hereunto set my hand, this 23d day of March, 1894, in the presence of two subscribing witnesses.

AUGUST STEINER.

Witnesses:
SIDNEY BRIGGS,
S. E. DARBY.